(12) United States Patent
Allart et al.

(10) Patent No.: US 6,199,377 B1
(45) Date of Patent: Mar. 13, 2001

(54) COMPACT HYDRAULIC MOTOR

(75) Inventors: Bernard Allart, Crepy-en-Valois; Louis Bigo, Compiegne; Marc Perot, Eve, all of (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/344,026

(22) Filed: Jun. 25, 1999

(30) Foreign Application Priority Data

Jun. 29, 1998 (FR) .................................................. 98 08209

(51) Int. Cl.[7] ...................................................... F16D 31/02
(52) U.S. Cl. ............................. 60/439; 92/72; 192/85 CA
(58) Field of Search ................................ 60/435, 436, 439, 60/440; 91/491, 496, 498; 92/12.1, 13.4, 72; 192/85 CA

(56) References Cited

U.S. PATENT DOCUMENTS

| 2,710,086 | * | 6/1955 | Stahl | 192/69.81 X |
| 4,293,061 | * | 10/1981 | Brown | 192/85 CA X |
| 4,686,829 | * | 8/1987 | Thoma et al. | 60/464 |
| 5,012,724 | * | 5/1991 | Giamello | 92/72 X |
| 5,178,524 | * | 1/1993 | Nicol | 92/72 X |
| 5,769,611 | * | 6/1998 | Djordjevic | 92/72 X |
| 5,855,115 | * | 1/1999 | Martin | 60/437 |

* cited by examiner

Primary Examiner—John E. Ryznic
(74) Attorney, Agent, or Firm—Ladas & Parry

(57) ABSTRACT

A hydraulic motor comprising a fixed case, a cam, a cylinder block having radial cylinders, an internal fluid distributor having distribution ducts, a braking device comprising a dog clutch, and a control piston. The motor is a slow motor having two distinct operating cylinder capacities. An annular space is formed in the case around the distributor beside the radial face of the cylinder block adjacent to the distributor, the first series of teeth of the dog clutch and the control piston are disposed in said annular space, the second series of teeth being secured to the radially-extending face of the cylinder block in the vicinity of the radially-outer periphery of said radially-extending face.

15 Claims, 3 Drawing Sheets

COMPACT HYDRAULIC MOTOR

FIELD OF THE INVENTION

The present invention relates to a hydraulic motor comprising:

a stationary case;

a reaction member secured to the case;

a cylinder block mounted to rotate about an axis of rotation relative to said reaction member and having a plurality of assemblies each comprising a cylinder and a piston, the assemblies being disposed radially relative to the axis of rotation and being suitable for being fed with fluid under pressure;

an internal fluid distributor constrained in rotation relative to the case about the axis of rotation and having distribution ducts suitable for putting the cylinders into communication with fluid feed and exhaust ducts; and a braking device comprising a dog clutch having first and second series of teeth respectively constrained in rotation with the case and with the cylinder block, and a control piston for controlling engagement and disengagement of the teeth of the dog clutch.

By way of example, it comprises a motor that is slow, operating at low speed and high torque, with such a motor under normal conditions conventionally driving the outlet shaft at rotary speeds of about 75 revolutions per minute (rpm) to 200 rpm, and being capable of generating cylinder capacities of up to 6 liters per revolution, or even about 10 liters per revolution.

Such a motor is used in particular for driving a planetary stepdown gearbox shaft for propelling tracked vehicles.

It is known that using a slow motor for driving a planetary stepdown shaft instead of using a fast motor makes it possible to reduce the number of stepdown stages (e.g. only one stage) in order to obtain the same speed of about 30 rpm to 70 rpm at the outlet from the stepdown gearbox.

Thus, the use of a slow motor associated with a stepdown gearbox makes it possible to reduce the axial size of the assembly constituted by the motor and the gearbox.

OBJECTS AND SUMMARY OF THE INVENTION

The invention seeks to further reduce this axial size by seeking to reduce the axial size of the motor or, at least, by proposing a motor assembly that is extremely compact.

This object is achieved by providing an annular space inside the case around the distributor beside the radial face of the cylinder block adjacent to the distributor, disposing the first series of teeth of the dog clutch and its control piston in said annular space, and securing the second series of teeth to said radial face of the cylinder block in the vicinity of the radially outer periphery of said radial face, such that the teeth of the dog clutch occupy a region of the motor that is remote from the axis of rotation.

This disposition presents several advantages. Firstly, the braking dog clutch is not axially in line with the distributor, but is disposed around it, so that the braking device is received within the axial extent of the distributor, thereby reducing the length of the case of the motor. The second series of teeth of the dog clutch is secured to the radial face of the cylinder block, thereby simplifying assembly of the various elements of the motor and making it possible to transmit braking torque directly by the cylinder block. In addition, the teeth of the dog clutch through which the braking torque is transmitted are situated in a large-diameter region of the motor, thereby making it possible to reduce considerably the risk of premature wear or breakage of motor parts, since for given braking torque, the forces exerted on the parts which transmit said torque are inversely proportional to the distance of said parts from the axis of rotation of the motor.

Advantageously, the cylinder capacity selection slide is disposed in an axial bore situated inside the distributor and is movable at least between a first position and a second position inside said bore, the slide having a selection groove which is situated in its radial periphery. Furthermore, the distribution ducts comprise a first series of distribution ducts which are permanently connected to a first distribution enclosure which is itself permanently connected to a first of the two feed and exhaust ducts, a second series of distribution ducts which are permanently connected to a second distribution enclosure which is itself permanently connected to a second of the two feed and exhaust ducts, and a third series of distribution ducts which, in the first position of the selection slide are connected to the ducts of the first series of distribution ducts via the selection groove and are isolated from the ducts of the second series, and which, in the second position of the selection slide are connected to the ducts of the second series of distribution ducts via the selection groove while being isolated from the ducts of the first series, each of the first, second, and third series of distribution ducts comprising at least one duct which opens out into the axial bore.

This disposition makes it possible to further reduce the axial size of the motor compared with a conventional motor having two cylinder capacities. For such conventional motors, the distribution ducts of the first, second, and third series are put into communication with the main feed and exhaust ducts of the motor via three grooves, one for each series, which grooves are disposed successively in the axial periphery of the distributor. In the advantageous configuration of the invention, the first distribution enclosure to which the ducts of the first series are connected can comprise a first groove situated in the outer axial periphery of the distributor and connected to the first feed and exhaust ducts, while the second distribution enclosure can be connected to the second of said ducts via a second groove situated in the outer axial periphery of the distributor. In contrast, there is no need to provide a third groove for connecting the ducts of the third series to one or other of the feed and exhaust ducts, since the slide selection groove, insofar as it is located on the axis of the motor, puts the ducts of the third series directly into communication with the ducts of the first series or of the second series, depending on the position of the slide. For this purpose, it suffices for at least one duct in each of the first, second, and third series to open out into the axial bore in which the slide is mounted to move, and for it to be possible for the ducts of each series to be interconnected.

Advantageously, the cylinder block has a plane radial communication face, while the distributor has a plane radial distribution face which is held pressed against said communication face by axial thrust means, and the motor has a single bearing for taking up radial forces and for taking up forces exerted axially in the thrust direction of said axial thrust means.

Thus, advantage is taken of the thrust applied by the distributor on the cylinder block so as to use only one rotary bearing (the axial bearing and the orthogonal bearing are united in a single bearing). The single bearing can have conical rollers, or balls that roll with two points of contact. Thus, the axial size of the motor is decreased relative to that of more conventional motors, since they have two conical roller bearings placed one after the other.

Advantageously, the single bearing has a center of thrust which is situated, on the axis of rotation of the motor, in the vicinity of the intersection between said axis and the radial plane defined by the radial axes of the pistons of the cylinder block.

When the motor is in operation, because the various pistons co-operate with the cam in succession, the cylinder block is subjected to parasitic forces tending to tilt it relative to the axis of rotation. The rotary bearing and the force exerted axially by the distributor on the cylinder block must enable these parasitic forces to be compensated. When the center of thrust of the bearing is situated in the vicinity of the intersection between the axis of rotation and the radial plane defined by the radial axes of the pistons of the cylinder block, these forces can be compensated more easily, without it being necessary for the distributor to exert a very high axial thrust force on the cylinder block.

It is advantageous for the valves for controlling the operation of the motor to be disposed in bores formed in the case of the motor.

In which case, it is advantageous for at least some of said valves to extend transversely relative to the axis of rotation of the motor and to be situated on the opposite side of the distributor relative to the cylinder block.

By way of example, these valves are valves that feed fluid to a control piston deactivation duct (engaging and disengaging the teeth of the braking dog clutch), a valve for limiting the speed of the motor (enabling hydraulic braking), shuttle check valves enabling certain secondary ducts of the motor to be connected selectively with the main ducts, or indeed non-return valves, or in general any type of valve making it possible to manage the various operating parameters of the motor.

By placing these valves inside the case of the motor, the assembly constituted by the motor and the valves for controlling its operation is rendered homogeneous and compact. By placing these valves transversely, they are prevented from giving rise to an excessive increase in the total axial size of the motor. In particular, insofar as the elements of the braking dog clutch are disposed around the distributor in accordance with the invention, the axial space that was previously occupied by the braking device can be used to receive the valves for controlling operation, such that for given total axial size of the motor, it is possible relative to the prior art also to place the valves in the motor.

Also, by placing the valves on the other side of the distributor relative to the cylinder block, the ducts in which they are disposed are caused to be easily accessible and the radial size of the motor is not increased. A motor is thus obtained that is provided with valves for controlling its operation within a size that is reduced both axially and radially.

In an advantageous disposition, the cylinder capacity selection slide is disposed in an axial bore formed in the distributor and is movable in said bore between at least a first position and a second position, the selection slide being constantly urged towards one of said positions, referred to as the "rest" position, by resilient return means; at its end adjacent to the cylinder block, the axial bore has a first radially-extending wall element secured to the distributor, and at its end adjacent to the distributor and remote from the cylinder block the axial bore opens out to a second radially-extending wall element secured to the case in such a manner that, in the rest position of the slide, the assembly formed by the slide and the resilient return means co-operates with the first and second radially-extending wall elements to urge the distributor to press against the cylinder block.

This disposition is extremely advantageous. When the motor is in operation, the distributor is generally held pressed against the cylinder block by hydraulic means because of the stepped shape of the outer cylindrical face of the distribution in which the grooves are formed for connecting the distribution ducts to the main ducts, and because of the fluid pressure that exists in these ducts.

Nevertheless, it is necessary to ensure that the distribution face presses against the communication face even when the motor is stopped, for the purpose of avoiding large leaks between these two faces when the motor is started, which leaks could even prevent the cylinder block from being set into rotation. It is thus conventional to provide one or more springs specifically for the purpose of pressing the distributor against the cylinder block when the motor is stopped.

In this disposition of the invention, this thrust is achieved directly by the original structure of the slide and the resilient return means thereof. It is therefore not necessary to provide one or more additional springs over and above the resilient return means of the slide. This reduces the number of parts of the motor and greatly simplifies assembly thereof.

BRIEF DESCRIPTION OF THE DRAWINGS

The invention will be well understood and its advantages will appear more clearly on reading the following detailed description of an embodiment given by way of non-limiting example. The description refers to the accompanying drawings, in which.

MORE DETAILED DESCRIPTION

Figure 1:
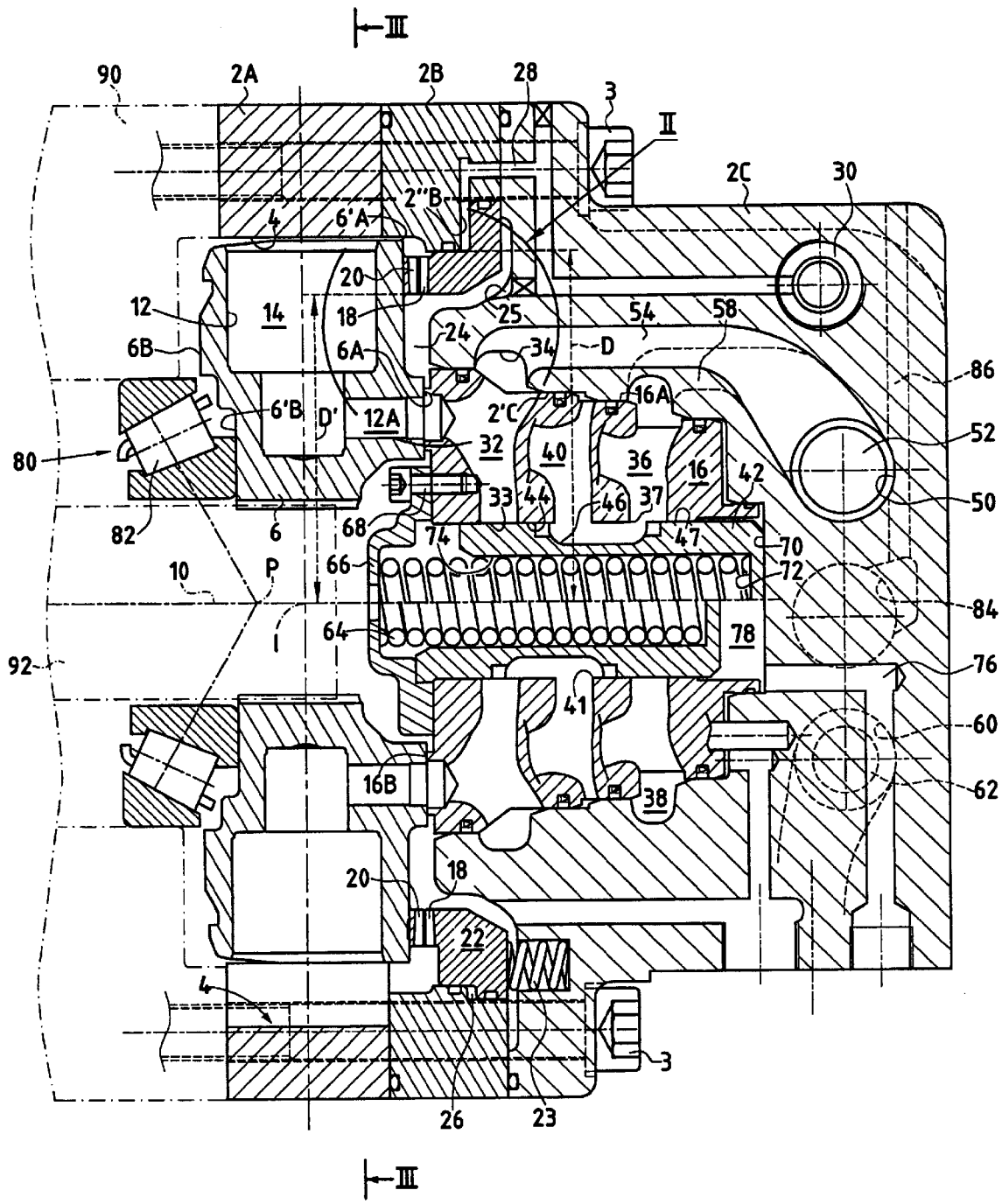
FIG. 1 is a diagrammatic axial section view of a motor in accordance with the invention.

To facilitate understanding the structure and the operation of the motor, FIG. 1 shows certain elements that do not all lie in the same axial section plane. This applies, for example, to the distribution ducts of the various series of ducts. That is why the shading is interrupted in certain zones.

FIG. 1 shows a hydraulic motor comprising a fixed case in three parts 2A, 2B, and 2C which are assembled together by screws 3. The motor includes a reaction member constituted by an undulating reaction cam 4 formed on the part 2A of the case.

Figure 3:
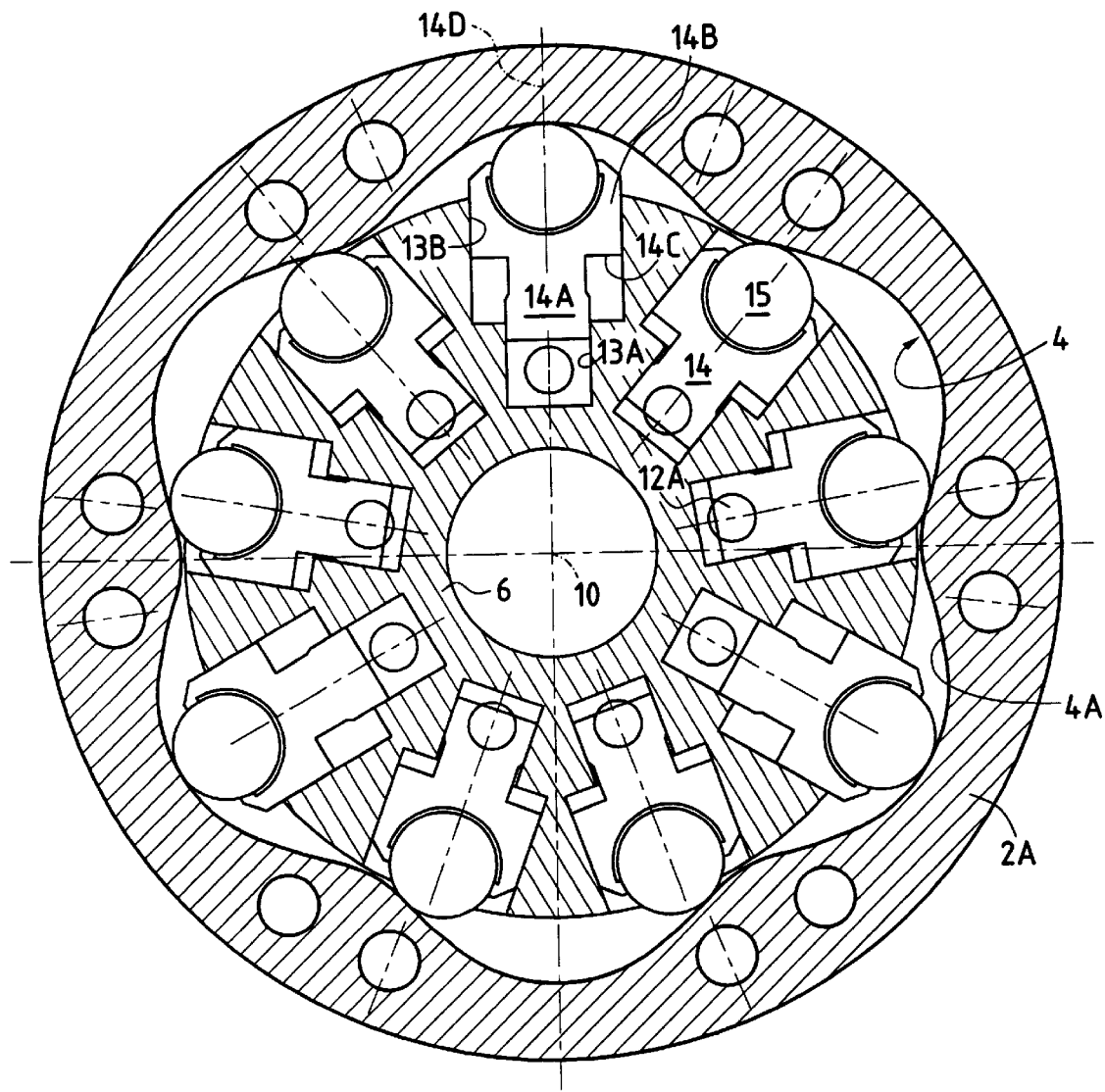
FIG. 3 is a section on line III—III of FIG. 1.

The motor also comprises a cylinder block 6 which is mounted to rotate about an axis of rotation 10 relative to the cam 4 and which has a plurality of radial cylinders 12 suitable for being fed with fluid under pressure, and within there radial pistons 14 are slidably received (not shown in FIG. 1, but shown in FIG. 3).

The motor also comprises an internal fluid distributor 16 constrained in rotation with the case with respect to rotation about the axis 10 and having distribution ducts suitable for communicating with the cylinders 12 so as to put them into communication with main ducts of the motor which serves to feed and exhaust fluid.

The motor includes a braking device which comprises a dog clutch having a first series of teeth constrained in rotation with the case and a second series of teeth constrained in rotation with the cylinder block. This braking device also has a piston 22 which serves to control engagement and disengagement of the teeth of the dog clutch. It can be seen that the control piston 22 is disposed in an annular space 24 which is formed in the case around the distributor 16 on the side of the radial face 6A of the cylinder block 6 adjacent to said distributor. In other words, the annular space 24 is situated close to the radial face 6A of the cylinder block, inside the case and around the distributor.

The part 2C of the case, commonly referred to as the "distribution cover", extends around the distributor and has an inner axial face 2'C facing the outer axial face 16A of the distributor. As explained below, the main ducts of the motor are formed in this distribution cover 2C and the distribution ducts are put into communication with the main ducts via grooves formed between the facing axial faces 2'C and 16A.

The annular space 24 has a portion which is formed in an annular recess 25 made in the radial face of the distribution cover 2C which faces towards the cylinder block.

The annular space 24 is disposed in a region of the motor which is relatively remote from the axis of rotation 10. The second series of teeth is secured to the radial face 6A of the cylinder block and is disposed in the vicinity of the outer radial end 6'A of said radial face. Clearly the teeth of the first series of teeth are located axially facing the teeth of the second series. Thus, the teeth of the dog clutch are situated in a region of the motor which is remote from the axis of rotation thereof.

The teeth of the second series of teeth can be integrally formed in the radial face 6A of the cylinder block, or they can be fastened to said radial face using any appropriate fastening means. The teeth of the first series of teeth 18 are constrained in rotation with the fixed case of the motor.

Figure 2:
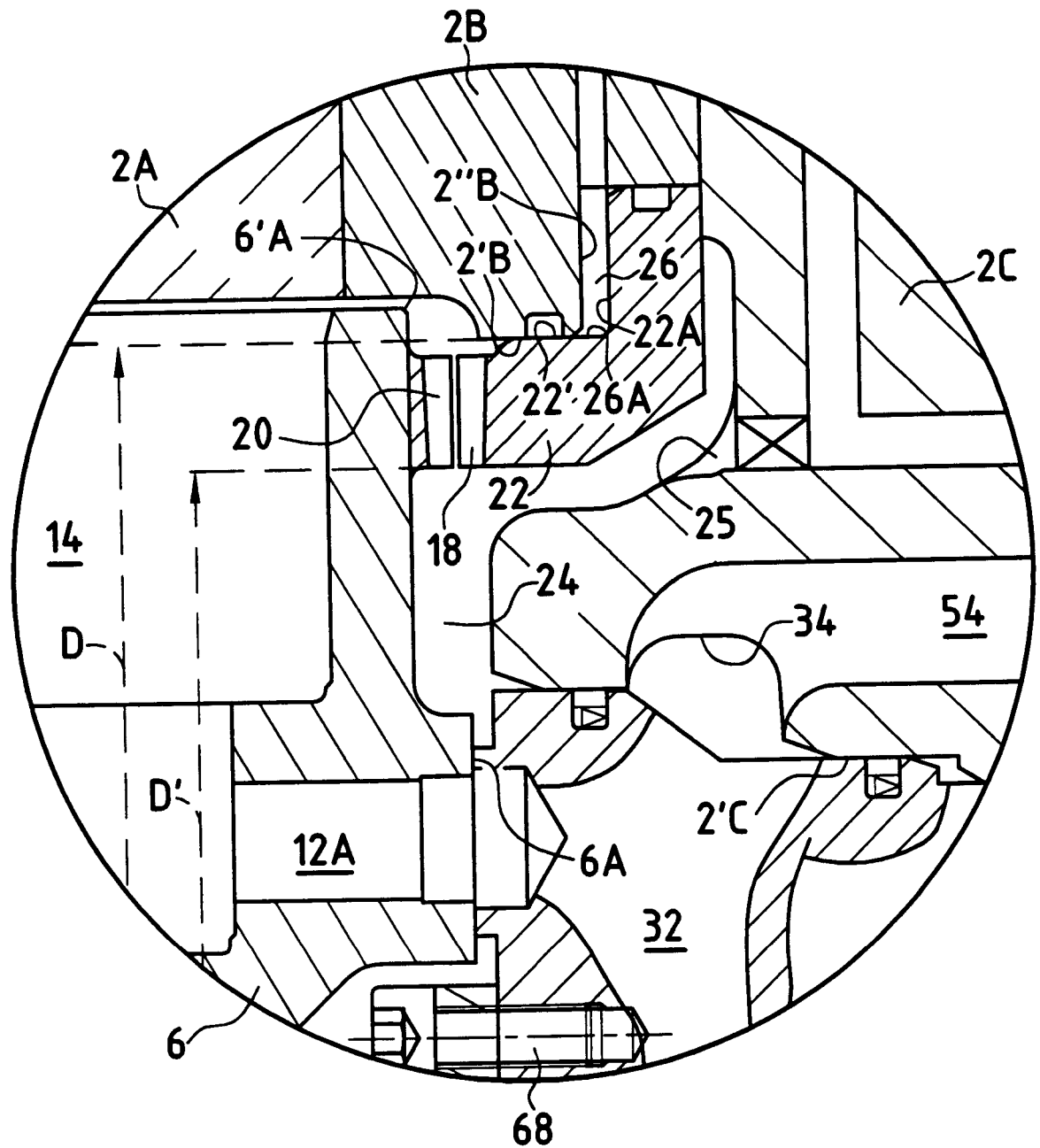
FIG. 2 is an enlarged view of portion II of FIG. 1.

Advantageously, as can be seen more clearly in FIG. 2, the first series of teeth is integral with the control piston 22 and it is the control piston which is constrained in rotation with the case. In the advantageous example shown, the piston 22 co-operates with a ring constituted by one of the parts of the case and is fixed to the reaction member by the case assembly means. More precisely, this ring is constituted by the part 2B of the case which is disposed between the part 2A carrying the cam 4 and the distribution cover 2C.

As mentioned above, the various parts of the case are fastened by means of screws 3. Thus, the part with which the piston co-operates for preventing the case rotating directly constitutes a part of the case which is fixed to the other parts of said case by the screws which are of a size that is sufficient to withstand the high stresses to which the parts of the case are subjected during operation of the motor. Thus, during braking, the braking torque is transmitted via the screws 3 which, given that they constitute the means for assembling the case, are necessarily dimensioned so as to be capable of withstanding high levels of torque.

The ring 2B and the control piston 22 present shapes on their contacting axial faces, respectively an inner axial face of the ring and an outer axial face of the piston, which shapes are adapted to constrain the piston in rotation with the ring 2B.

For this purpose, the faces enabling the piston to be constrained in rotation with the ring can be undulating and can engage one in the other. For example, the faces 2'B and 22' can be undulating faces, while the faces 2"B and 22" are cylindrical, or vice versa.

By using undulations to provide constraint in rotation, it is possible to ensure that a sealing gasket of simple shape (undulating and of constant thickness) is placed between the faces of the ring and of the piston that are provided with these undulations for the purpose of defining the brake deactivation chamber 26 which is described below.

At least some of these undulations advantageously correspond to undulations of the cam 4. They can be different, and a single braking assembly comprising the coupling ring and the control piston can be fitted to motors having different cams.

The motor has means for controlling displacement of the piston 22 between the engaged and the disengaged positions of the dog clutch. Thus, a braking device deactivation chamber 26 is provided between the piston 22 and the ring 2B. This chamber has radial walls constituted by a radial face 22A of the piston facing towards the cylinder block, and by a radial face 2"B of the ring 2B facing it.

To urge the piston into its disengaged position as shown in FIG. 1, the chamber 26 can be fed with fluid via a deactivation duct 28. Selective connection of this duct to a source of fluid under pressure and to means for evacuating fluid can be provided by means of a valve 30 for controlling the braking device and situated in the part 2C of the case. The deactivation duct 28 has a segment that is formed in said part 2C and a segment that is formed in the part 2B. Gaskets define the deactivation chamber 26 in sealed manner. This chamber is situated radially outside the portion of the piston that carries the teeth 18.

The control piston 22 is continuously urged in the direction for engaging the teeth of the dog clutch by resilient return means, e.g. comprising a spring such as a Belleville washer or a plurality of helical springs 23 that are uniformly distributed angularly (e.g. three springs at 120° intervals). It can be seen that the chamber 26 is situated generally "outside" the teeth of the dog clutch.

In other words, this chamber is organized in such a manner that the distance D to the axis 10 from the wall 26A of the chamber 26 which is closest to said axis is greater than or equal to the minimum distance D' between the teeth of the dog clutch (where they engage) and the axis of the motor. Naturally, when as in the example shown, the wall 26A of the chamber is situated in line with the axial wall 22' of the piston which co-operates in rotary engagement with the wall 2'B of the ring 2B, and when the means for providing constraint in rotation are formed by undulations, the distance D is measured from the "furrows" of the undulations.

It can also be seen that the resilient return means, e.g. the springs 23, co-operate with the control piston 22 in a region of the piston which is situated substantially axially facing the deactivation chamber 26.

In this way, the deactivation chamber is relatively remote from the axis of the motor, as are the means for returning the piston towards its engaged position. Thus, whether the piston is urged towards its engaged position or towards its disengaged position, the tilting moments generated by parasitic friction between the piston of the brake device and the axial faces on which it slides are easily overcome and compensated by the means (chamber 26 or spring 23) which urge the piston into one or other of said positions.

The distribution ducts of the distributor 16 comprise a plurality of series of ducts. There is a first series of ducts 32 permanently connected to a first distribution enclosure which is constituted, in the example shown, by a first groove 34 formed between the facing axial faces 2'C and 16A, said first enclosure being permanently connected to a first of the two main feed and exhaust ducts.

There is then a second series of distribution ducts 36 which are permanently connected to a second enclosure constituted, in the example shown, by a second groove 38 formed between the axial faces 2'C and 16A, said enclosure being permanently connected to the second main feed or exhaust duct. Finally, there is a third series of distribution ducts 40 which, depending on the position of the cylinder capacity selection slide 42 can be connected to the ducts of the first series or to the ducts of the second series.

The slide 42 is placed in an axial bore 44 which is situated in the center of the distributor 16 (it is centered on the axis 10). The slide 42 has a selection groove 46 formed in its outer axial periphery.

Each of the first, second, and third series of distribution ducts includes at least one duct which opens out into the axial bore 44. In the example shown, all of the ducts in each series open out into the bore 44, the openings 33 of the ducts 32 in the bore 44 all being situated on a first common axial segment of the bore. Similarly, the openings 37 of the ducts 36 into the bore are all situated on a second common axial segment of the bore, while the openings 41 of the third ducts 40 are situated in a third common axial segment of the bore.

These first, second, and third segments are distinct from one another, with the third segment being situated between the other two.

Thus, in the first position of the slide 42 as shown in the bottom half of FIG. 1, the groove 46 extends between the first and third axial segments so that it puts the ducts of the series 32 and 40 into communication with one another, while the cylindrical periphery 47 of the slide 42 that does not have a groove closes the openings 37. In contrast, in the second position of the slide 42 as shown in the upper portion of FIG. 1, the groove 46 interconnects the second and third axial segments of the bore, while the periphery of the slide that does not have any groove closes the openings 33.

Substantially radial wall portions of the axial periphery 16A of the distributor which are to be found in the grooves 34 and 38 serve, because of the pressure of the fluid present in one or other of these grooves, to press the distributor hydraulically against the cylinder block. In FIG. 1, it can be seen that the ducts of the third series 40 also open out in the axial periphery 16A of the distributor in a step situated between the grooves 34 and 38. Because of the substantially radial wall portion of the distributor that is to be found in this step, this disposition makes it possible to ensure that the ducts of the third series also contribute to hydraulically pressing the distributor against the cylinder block.

The distributor 16 has a distribution face 16B into which all of the distribution ducts open out, thereby forming distribution orifices. This distribution face 16B presses against the communication face 6A of the cylinder block in which there open out the cylinder ducts 12A to form the cylinder duct orifices which, in turn, come into register with the distribution orifices during rotation of the cylinder block relative to the distributor.

In the cross-section of FIG. 3, there can be seen the cylinders 12 in which the pistons 14 are located, which pistons co-operate with lobes 4A of the cam 4 via rollers 15. There can also be seen the cylinder ducts 12A which are situated, on a common circle, in the region of the cylinders adjacent to the axis 10. The assembly shown in FIG. 3 has nine assemblies each comprising a cylinder 12 and a piston 14 located inside the cylinder, which assemblies are uniformly distributed angularly. The cam 4 has six cam lobes 4A that are analogous to one another.

As described below, this disposition is advantageous in particular when it is desired to obtain certain ratios between the first and second cylinder capacities of the motor. Nevertheless, the invention is not limited to this particular disposition and it is possible, for example, to have six lobes of the cam 4A in association with eleven, or thirteen, or fifteen assemblies each comprising one cylinder and one piston.

The distributor has twelve distribution ducts disposed in such a manner that when the motor is at its maximum cylinder capacity, each lobe has available to it both one distribution duct connected to the feed and one distribution duct connected to the exhaust.

Advantageously, the ratio between the first and second operating cylinder capacities of the motor, in volume terms, is substantially equal to 1.5. As mentioned above, the motor of the invention can serve in particular for driving the shaft of a planetary stepdown gear which is used for propelling a worksite vehicle such as a tracked vehicle. The functions of such vehicles is provided by tools, e.g. diggers, under hydraulic control. Preferably, a single hydraulic pump is provided both to feed the tools and to feed the hydraulic motor.

The pump is generally dimensioned so as to be capable of providing optimal drive for the actuators or the like which actuate the tools hydraulically. Conventionally, the motor operates with a small cylinder capacity for fast displacements, while the tools are not engaged, and it operates with a large cylinder capacity when the vehicle is in use on a worksite, actually performing its function (e.g. digging) so as to allow the vehicle to perform small displacements.

It is important that the torque delivered while using the small cylinder capacity of the motor is sufficient to enable some "difficult" displacements to be performed, and in particular to overcome the friction of the tracks on the ground when the vehicle needs to turn. It has been found that as a function of conventional dimensioning for pumps of such worksite vehicles, a ratio of large cylinder capacity to small cylinder capacity that is substantially equal to 1.5 is entirely satisfactory.

The configuration comprising nine cylinder-and-piston assemblies and six cam lobes constitutes a particularly advantageous solution for providing this ratio of 1.5 between the large and small cylinder capacities in a small amount of radial space (the higher the number of cylinders, the greater the radial space is likely to be).

Under such circumstances, it suffices to ensure that the first series of distribution ducts 32 has four ducts while the third series of distribution ducts has two ducts, and the second series of ducts has six ducts. Two distribution ducts correspond to each of the six lobes of the cam. Thus, the four ducts of the first series are disposed in correspondence respectively with four of the six lobes of the cam, while the two ducts of the third series are disposed in correspondence with the other two lobes of the cam, and each of the six ducts of the second series is disposed in correspondence with each of the six lobes of the cam.

Under such circumstances, with the large cylinder capacity, i.e. when the slide 42 is in its position in which the ducts of the first series and the ducts of the third series are interconnected, a total of six distribution ducts can be connected to a first of the two main ducts of the motor, while the other six ducts (those of the second series) are connected to the other main duct. In other words, for each cam lobe 4A there is a distribution duct (in the first or the third series) serving for feed or exhaust purposes, and another distribution duct (of the second series) serving for exhaust or feed purposes.

In contrast, for operation at small cylinder capacity, when the slide 42 is in its second position, the two ducts of the third series are connected to the six ducts of the second series. Thus, only four of the six lobes of the cam have both a distribution duct connected to the first main duct (a duct in the first series) and a duct connected to the second main duct (four of the six ducts of the second series). In contrast, the two distribution ducts corresponding to each of the two remaining cam lobes (one duct of the third series and one duct of the second series for each lobe) are at the same pressure. Consequently these two cam lobes are inactive.

In other words, at large cylinder capacity, the six lobes of the cam are active, while only four of the six lobes of the cam are active at small cylinder capacity. The ratio between large and small cylinder capacities is thus indeed equal to 1.5. The choice as to the number of pistons (9, 11, 13, 15) serves to obtain a motor whose velocity, even at small cylinder capacity, is constant, i.e. at constant feed rate, the outlet speed of the shaft is constant regardless of the angular position of the cylinder block.

When the four ducts of the first series are connected to the feed while the ducts of the second and third series are connected to the exhaust, the motor operates in its preferred direction of rotation. In the opposite direction of rotation, the pistons situated facing the inactive cam lobes are fed with high pressure even in the descending portion of the cam lobe, and this direction of rotation is the non-preferred direction.

By providing nine cylinder-and-piston assemblies that are uniformly distributed angularly it is possible to ensure that even at small cylinder capacity, the pistons are properly positioned relative to the active cam lobe to ensure that the motor rotates.

For certain types of vehicle, it can be advantageous to ensure that the ratio between the large and small cylinder capacities is substantially equal to 3. This is the case in particular when the motor is connected to the planetary stepdown gear shaft used for propelling an agricultural machine having wheels or a civil engineering vehicle having wheels or rollers, e.g. compactors, which vehicles have tools for performing their functions under hydraulic control.

As in the case mentioned above, it is advantageous to provide only one pump both for feeding the motor and for feeding the tool control circuit. In such vehicles, when working, the friction forces to be overcome in moving them over the ground are lower, as are the forces required to make them turn, than they would be for a tracked vehicle. It has thus been found that a ratio substantially equal to 3 between the large and small cylinder capacities is entirely satisfactory.

When the motor of the invention has nine cylinder-and-piston assemblies and six cam lobes, this cylinder capacity ratio that is substantially equal to 3 is likewise very easy to obtain. It suffices for the first series of distribution ducts to have two ducts while the third series has four ducts, the second series still having six ducts. Under such circumstances, with the large cylinder capacity, the six ducts comprising two ducts of the first series and four ducts of the second series are connected to a first main duct while the six ducts of the second series are connected to the other main duct. In contrast, in small cylinder capacity operation, only the two ducts of the first series are connected to the first main duct, while the four ducts of the third series and the six ducts of the second series are connected to the second main duct. With the disposition described above, it will be understood that with the small cylinder capacity, only two of the six cam lobes are active. A ratio of 3 is thus indeed obtained between the large and the small cylinder capacities.

It should be observed that although cylinder capacity ratios substantially equal to 3 and to 1.5 can be advantageous in certain applications, the invention is naturally equally applicable to motors in which the cylinder capacity ratios are different, e.g. substantially equal to 2 (in which case, for a motor having six cam lobes, there are three distribution ducts in the first and third series of distribution ducts, and six ducts in the second series).

In FIGS. 1 and 2, it can be seen that the cylinders 12 and the pistons 14 are stepped. More precisely, each piston has a first portion 14A close to the axis of rotation 10 and a second portion 14B further away from the axis of rotation and joining the first portion via a step 14C. The section (defined transversely to the axis 14D of each piston) of the second portion 14B of each piston is greater than the section of the first portion 14A. Similarly, each cylinder 12 has a first portion 13A matching the first portion 14A of each piston and a second portion 13B matching the second portion 14B of each piston. It can be understood from FIG. 3 that this disposition makes it possible to obtain a relatively large cylinder capacity for the motor (i.e. total cylinder volume) while still making it possible to place the pistons relative to one another. For given cylinder capacity, this makes it possible to obtain a motor of smaller radial size than when the cylinders and the pistons are not stepped.

It is mentioned above that the cylinder capacity selection slide 42 is movable between at least two positions within the axial bore 44 in which it is received.

More precisely, the slide 42 is constantly urged towards one of its positions (in this case the second position) by resilient return means which, in the example shown, comprise a helical spring 64. At the cylinder block end, the bore 44 in which the slide 42 is received has a first radial wall element 66 which is secured to the distributor 16, e.g. by means of a fastening screw 68. At the end of the distributor opposite from the cylinder block 6, the bore opens out via a second radial wall element 70 which is integral with the case. For example, in the example shown, this element 70 is constituted by a radial face of the distribution cover 2C. In the example shown, the spring 64 bears directly against the first radial wall element 66, while at the opposite end, it bears against the end wall 72 (which extends radially) of the hole 74 in the slide 42 in which it is received.

It would also be possible to envisage an opposite disposition in which the spring 64 bears directly against the second radial wall element 70 while the hole 74 is made in the opposite manner from that shown in FIG. 1, with its end wall 72 being adjacent to the cylinder block.

In either case, it can be seen that the assembly constituted by the slide 42 and the spring 64 bears resiliently against the first and second radial wall elements 66 and 70 so as to urge the distributor 16 to press against the cylinder block 6.

In the example shown in FIG. 1, the slide 42 is urged towards its first position by hydraulic control means comprising a duct 76 which serves to feed fluid to a chamber 78 formed between the end of the slide 42 remote from the cylinder block, the wall element 70, and a segment of the cylindrical wall of the bore 44. To urge the slide towards its first position, or on the contrary to enable it to be returned into its second position, the duct 76 can be connected to a source of hydraulic fluid or to a fluid exhaust.

FIG. 1 shows that the motor has a single bearing 80 which serves both to take up radial forces and to take up forces exerted axially in the same direction as the distributor bears against the cylinder block. This single bearing has conical rollers 82. Reference P shows the center of thrust of the single bearing 80. It can be seen that it is situated on the axis of rotation 10 of the motor and that it is located close to the intersection I between said axis and the radial plane defined by the radial axes 14D of the pistons 14 in the cylinder block.

The radial face 6B of the cylinder block 6 which is remote from the distributor has a setback 6'B which extends over a region corresponding to the first portions 13A of the cylinders 12. This setback is made possible by the smaller section of said first portions compared with the second portions 13B of the cylinders. This disposition makes it possible to place a single bearing 80 at least in part within the setback 6'B, thus further reducing the axial size of the motor.

In FIG. 1, the various positions of the valves shown in the operation of the motor are shown diagrammatically. The valve 30 controlling feed to the duct 28 has already been mentioned.

These control valves can also comprise a speed limiter formed by the bore 50 and the slide 52 disposed in said bore. Two ducts 54 and 58 extend from the bore 50 constituting bypasses in parallel with the main ducts and opening out respectively into the grooves 34 and 38. The slide 50 controls selective connection of the ducts 54 and 58 with the speed limiter outlet.

The control valves also comprise two non-return valves 84 (only one of these valves is visible in FIG. 1) which are placed at the outlet from the speed limiter and which serve, via ducts 86, to connect said outlet with that one of the main ducts which is at low pressure.

The control valves also comprise non-return valves. Thus, a moving member 62 disposed in the bore 60 can be placed on the first main duct (an analogous non-return valve is placed on the second main duct).

These valves extend transversely relative to the axis 10 and are situated on the opposite side of the distributor 16 relative to the cylinder block 6.

In FIG. 1, a chain-dotted line represents the position of a case 90 which can be fixed to the motor case and which contains, for example, a planetary stepdown gear, with a shaft 92 that can be used for propelling agricultural vehicles or worksite vehicles, e.g. tracked vehicles or a compactor.

The invention applies to motors having at least two distinct operating cylinder capacities. Although only the advantageous embodiment having two distinct operating cylinder capacities have been specifically described, it must be understood that it is also possible to apply the invention to a motor having three distinct operating capacities, by appropriately providing control means for selecting cylinder capacity.

What is claimed is:

1. A hydraulic motor comprising:
   a stationary case;
   a reaction member secured to the case;
   a cylinder block mounted to rotate about an axis of rotation relative to said reaction member and having a plurality of assemblies each comprising a cylinder and a piston, the assemblies being disposed radially relative to the axis of rotation and being suitable for being fed with fluid under pressure;
   an internal fluid distributor constrained in rotation relative to the case about the axis of rotation and having distribution ducts suitable for putting the cylinders into communication with fluid feed and exhaust ducts; and
   a braking device comprising a dog clutch having first and second series of teeth respectively constrained in rotation with the case and with the cylinder block, and a control piston for controlling engagement and disengagement of the teeth of the dog clutch; the motor having at least two distinct operating cylinder capacities and including a cylinder capacity selection slide situated inside the case,
   wherein an annular space is provided inside the case around the distributor beside the radial face of the cylinder block adjacent to the distributor, wherein the first series of teeth of the dog clutch and its control piston are disposed in said annular space, and wherein the second series of teeth is secured to said radial face of the cylinder block in the vicinity of the radially outer periphery of said radial face, such that the teeth of the dog clutch occupy a region of the motor that is remote from the axis of rotation.

2. A motor according to claim 1, wherein the cylinder capacity selection slide is disposed in an axial bore situated inside the distributor and is movable at least between a first position and a second position inside said bore, the slide having a selection groove which is situated in its radial periphery, and wherein the distribution ducts comprise a first series of distribution ducts which are permanently connected to a first distribution enclosure which is itself permanently connected to a first of the two feed and exhaust ducts, a second series of distribution ducts which are permanently connected to a second distribution enclosure which is itself permanently connected to a second of the two feed and exhaust ducts, and a third series of distribution ducts which, in the first position of the selection slide are connected to the ducts of the first series of distribution ducts via the selection groove and are isolated from the ducts of the second series, and which, in the second position of the selection slide are connected to the ducts of the second series of distribution ducts via the selection groove while being isolated from the ducts of the first series, each of the first, second, and third series of distribution ducts comprising at least one duct which opens out into the axial bore.

3. A motor according to claim 1, wherein the ratio between the first and second operating cylinder capacities of the motor, in volume terms, is substantially equal to 1.5.

4. A motor according to claim 2, wherein the ratio between the first and second operating cylinder capacities of the motor, in volume terms, is substantially equal to 1.5, wherein the reaction member is a cam having six cam lobes or the like, while the cylinder block has nine assemblies each comprising a cylinder and a piston movable in the cylinder, which assemblies are uniformly distributed angularly, and wherein the first series of distribution ducts has four ducts, while the third series of distribution ducts has two ducts and the second series of distribution ducts has six ducts.

5. A motor according to claim 1, wherein the ratio between the first and second operating cylinder capacities of the motor, in volume terms, is substantially equal to 3.

6. A motor according to claim 2, wherein the ratio between the first and second operating cylinder capacities of the motor, in volume terms, is substantially equal to 3, wherein the reaction member is a cam having six cam lobes or the like, while the cylinder block has nine assemblies each comprising a cylinder and a piston movable in the cylinder, which assemblies are uniformly distributed angularly, and wherein the first series of distribution ducts has two ducts, while the third series of distribution ducts has four ducts and the second series of distribution ducts has six ducts.

7. A motor according to claim 1, wherein the cylinder block has a plane radial communication face, while the distributor has a plane radial distribution face which is held pressed against said communication face by axial thrust means, and wherein it has a single bearing for taking up radial forces and for taking up forces exerted axially in the thrust direction of said axial thrust means.

8. A motor according to claim 7, wherein the single bearing has a center of thrust which is situated, on the axis of rotation of the motor, in the vicinity of the intersection between said axis and the radial plane defined by the radial axes of the pistons of the cylinder block.

9. A motor according to claim 1, in which the control piston is suitable for being displaced in the direction for disengaging the teeth of the dog clutch by feeding fluid to a braking deactivation chamber, while said piston is permanently urged in the direction for engaging the teeth of the dog clutch by resilient return means, wherein the deactivation chamber which extends around the distributor is organized in such a manner that the distance to the axis of rotation of the motor from the wall of the deactivation chamber that is the closest to said axis is greater than or equal to the minimum distance between the teeth of the dog clutch and the axis of the motor, and wherein the resilient return means cooperate with the control piston in a region of said piston which is situated substantially axially facing the deactivation chamber.

10. A motor according to claim 1, wherein the first series of teeth is secured to the control piston, the control piston being constrained in rotation with the case by co-operation between a ring which constitutes one of the parts of the case and is fixed to the reaction member by the assembly means of the case, said ring and said control piston presenting, on contacting faces, respectively a radially inner face of the ring and a radially outer face of the piston, shapes that are adapted to this purpose.

11. A motor according to claim 1, wherein the pistons are stepped, each piston having a first portion close to the axis of rotation and having a first section, and a second portion further from the axis of rotation, connected to the first portion via a step, and having a second section that is greater than the first section, each cylinder likewise having first and second portions respectively matching the first and second portions of each piston.

12. A motor according to claim 11, wherein the single bearing has a center of thrust which is situated, on the axis of rotation of the motor, in the vicinity of the intersection between said axis and the radial plane defined by the radial axes of the pistons of the cylinder block, wherein the radially-extending face of the cylinder block that is remote from the internal distributor has a setback which extends in a region corresponding to the first portions of the cylinders, and wherein the single bearing is received at least in part in said setback.

13. A motor according to claim 1, wherein valves for controlling the operation of the motor are disposed in bores formed in the case of the motor.

14. A motor according to claim 13, wherein at least some of said valves extend transversely relative to the axis of rotation of the motor and are situated on the opposite side of the distributor relative to the cylinder block.

15. A motor according to claim 1, wherein the cylinder capacity selection slide is disposed in an axial bore formed in the distributor and is movable in said bore between at least a first position and a second position, the selection slide being constantly urged towards one of said positions, referred to as the "rest" position, by resilient return means, and wherein, at its end adjacent to the cylinder block, the axial bore has a first radially-extending wall element secured to the distributor, and at its end adjacent to the distributor and remote from the cylinder block the axial bore opens out to a second radially-extending wall element secured to the case in such a manner that, in the rest position of the slide, the assembly formed by the slide and the resilient return means co-operates with the first and second radially-extending wall elements to urge the distributor to press against the cylinder block.

* * * * *